(12) United States Patent
Yang et al.

(10) Patent No.: US 11,966,134 B2
(45) Date of Patent: Apr. 23, 2024

(54) ARRAY SUBSTRATE AND DISPLAY DEVICE

(71) Applicant: HKC CORPORATION LIMITED, Shenzhen (CN)

(72) Inventors: Yanna Yang, Shenzhen (CN); Wei Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/078,338

(22) Filed: Dec. 9, 2022

(65) Prior Publication Data

US 2023/0296947 A1    Sep. 21, 2023

(30) Foreign Application Priority Data

Mar. 16, 2022   (CN) .......................... 202210258029.4

(51) Int. Cl.
  *G02F 1/1362*   (2006.01)
(52) U.S. Cl.
  CPC .. *G02F 1/136286* (2013.01); *G02F 1/136222* (2021.01); *G02F 1/136213* (2013.01)
(58) Field of Classification Search
  CPC .................................................... G02F 1/1362
  See application file for complete search history.

(56) References Cited

U.S. PATENT DOCUMENTS

| 5,831,605 A * | 11/1998 | Yasui | G09G 3/3655 |
| | | | 345/204 |
| 2008/0186289 A1* | 8/2008 | Ijima | G06F 3/0412 |
| | | | 345/175 |
| 2008/0265253 A1* | 10/2008 | Tian | G02F 1/1345 |
| | | | 257/E21.535 |
| 2015/0219944 A1 | 8/2015 | Mitsumoto et al. | |
| 2017/0357345 A1* | 12/2017 | Ikeda | G06F 3/0412 |
| 2020/0019031 A1 | 1/2020 | Koide et al. | |
| 2020/0203383 A1* | 6/2020 | Kim | H01L 27/124 |
| 2020/0328232 A1 | 10/2020 | Chen et al. | |

(Continued)

FOREIGN PATENT DOCUMENTS

| CN | 1523560 A | 8/2004 |
| CN | 1722452 A | 1/2006 |
| CN | 102253550 A | 11/2011 |

(Continued)

*Primary Examiner* — Sang V Nguyen
(74) *Attorney, Agent, or Firm* — Maier & Maier, PLLC

(57) ABSTRACT

An array substrate and a display device. The array substrate includes a base substrate, a plurality of pixel electrodes, a plurality of first common electrodes, a first-common-signal line and a connection line, that are disposed on the base substrate. The first common electrode is a common electrode of the array substrate. The connection line is connected between the first-common-signal line and the first common electrode, enabling a voltage from the first-common-signal line to be output to the first common electrode through the connection line. The array substrate also includes a detection line, the detection line and the first-common-signal line are insulated from each other, and an orthographic projection of the detection line on the base substrate and an orthographic projection of the first-common-signal line on the base substrate have at least one intersection point. The detection line is also arranged to be extended outside the base substrate.

20 Claims, 11 Drawing Sheets

(56) References Cited

U.S. PATENT DOCUMENTS

2021/0357095 A1* 11/2021 Yoshida ................ G06F 3/0412

FOREIGN PATENT DOCUMENTS

| | | |
|---|---|---|
| CN | 106981252 A | 7/2017 |
| CN | 107179637 A | 9/2017 |
| CN | 107742636 A | 2/2018 |
| CN | 108628047 A | 10/2018 |
| CN | 108873524 A | 11/2018 |
| CN | 110196506 A | 9/2019 |
| CN | 110221490 A | 9/2019 |
| CN | 111554718 A | 8/2020 |
| CN | 111965904 A | 11/2020 |
| CN | 113009728 A | 6/2021 |
| CN | 113448131 A | 9/2021 |
| CN | 214122635 U | 9/2021 |
| CN | 113467144 A | 10/2021 |
| CN | 215526310 U | 1/2022 |
| JP | 2001324721 A | 11/2001 |
| TW | 200638143 A | 11/2006 |
| WO | 2021179747 A1 | 9/2021 |
| WO | 2021190508 A1 | 9/2021 |
| WO | 2022000232 A1 | 1/2022 |

* cited by examiner

ARRAY SUBSTRATE AND DISPLAY DEVICE

CROSS-REFERENCE TO RELATED APPLICATION

Pursuant to 35 U.S.C. § 119 and the Paris Convention, this application claims the benefit of Chinese Patent Application No. 202210258029.4 filed on Mar. 16, 2022, the content of which is incorporated herein by reference.

FIELD

The present application relates to the field of display technology, and in particular, to an array substrate and a display device.

BACKGROUND

The statements provided herein are merely background information related to the present application, and do not necessarily constitute any prior arts. In a display panel, multiple data lines, multiple pixel electrodes, multiple array-substrate common electrodes and color-filter-substrate common electrodes are included. Each pixel electrode is configured to form a capacitor when coupled with a common electrode of a color filter substrate, and is also configured to form a capacitor when coupled with a common electrode of an array substrate. The plurality of data lines are used for inputting a voltage to the plurality of pixel electrodes when the display panel is in operation. Voltages at the multiple array-substrate common electrodes and color-filter-substrate common electrodes should remain unchanged.

However, in the display panel, a parasitic capacitance will occur between the data line and the common electrode of the array substrate. In this circumstance, when the voltage output from the data line to the pixel electrode has a variation, the common electrode of the array substrate will be affected by the parasitic capacitance caused due to the voltage variation, such that the voltage at the common electrode of the array substrate will also have a variation. In the existing technologies, the voltage variation at the common electrode of the array substrate cannot be detected.

SUMMARY

The present application provides an array substrate and a display device, which can solve the problem in the related technologies that the voltage variation at the common electrode of the array substrate cannot be detected. Embodiments of the present application are as follows:

In accordance with a first aspect of the present application, an array substrate is provided, which includes: a base substrate; and a plurality of pixel electrodes, a plurality of first common electrodes, a first-common-signal line and a connection line, that are disposed on the base substrate.

The array substrate includes a first region and a second region surrounding the first region along an extending direction of the base substrate. The plurality of pixel electrodes and the plurality of first common electrodes are located in the first region, and one of the plurality of first common electrodes is configured to be coupled with one of the plurality of pixel electrodes to form a capacitor. The first-common-signal line is located in the second region, a first end of the connection line is connected with the first-common-signal line, and a second end of the connection line is connected with the plurality of first common electrodes.

The array substrate also includes a detection line. A portion of the detection line is located in the second region, and the other portion of the detection line is extended outside the base substrate. The detection line and the first-common-signal line are insulated from each other, and an orthographic projection of the detection line on the base substrate and an orthographic projection of the first-common-signal line on the base substrate have at least one intersection point.

In the present application, the array substrate includes a base substrate and a plurality of pixel electrodes, a plurality of first common electrodes, a first-common-signal line and a connection line, disposed on the base substrate. One first common electrode is configured to be coupled with one pixel electrode to form a capacitance. That is, the first common electrode is a common electrode of the array substrate. The connection line is connected between the first-common-signal lines and the first common electrodes, thereby enabling a voltage of the first-common-signal line to be output to the first common electrode through the connection line. The array substrate also includes a detection line, the detection line and the first-common-signal line are insulated from each other, and the orthographic projection of the detection line on the base substrate and the orthographic projection of the first-common-signal line on the base substrate have at least one intersection point. The detection line is also extended outside the base substrate. In this way, the detection line and the first-common-signal line can be conveniently connected at a position where the orthographic projections of the two intersect. When the detection line and the first-common-signal line are connected at the position where the orthographic projections of the two intersect, the voltage variation at the common electrode of the array substrate can be obtained by detecting the voltage variation of the detection line outside the base substrate.

Optionally, the orthographic projection of the detection line on the base substrate and the orthographic projection of the first-common-signal line on the base substrate do not overlap with each other.

Optionally, the array substrate includes a plurality of connection lines, a first end of each connection line in the plurality of connection lines is connected with the first-common-signal line, and a second end of each connection line in the plurality of connection lines is connected with the first common electrodes.

The detection line includes a first conductive part and at least one second conductive part, a portion of the first conductive part is located in the second region, and the other portion of the first conductive part is extended outside the base substrate. A first end of each second conductive part in the at least one second conductive part is connected with the first conductive part, and an orthographic projection of a second end of each second conductive part in the at least one second conductive part on the base substrate is coincided with an orthographic projection of a first end of one of the plurality of connection lines on the base substrate.

Optionally, the detection line includes a plurality of second conductive parts, and distances between any two adjacent second conductive parts along an arrangement direction of the plurality of second conductive parts are all equal.

Optionally, an extending direction of the first conductive part is the same as an extending direction of the first-common-signal line.

Optionally, the orthographic projection of the first-common-signal line on the base substrate is located between the orthographic projection of the first conductive part on the base substrate and the first region.

Optionally, the array substrate also includes an insulator. The insulator is located between the detection line and the first-common-signal line, to enable the detection line and the first-common-signal line to be insulated from each other.

In accordance with a second aspect of the present application, a display device is provided, which includes a display panel and a chip on film.

The display panel includes the array substrate according to any one according to the first aspect. The chip-on-film has a first-common-signal output end and a signal detection end, the first-common-signal line is connected with the first-common-signal output end, and the other portion of the detection line is connected with the signal detection end.

Optionally, the chip-on-film has two first-common-signal output ends and two signal detection ends. The first-common-signal line is connected between the two first-common-signal output ends, and the first-common-signal line is arranged surrounding the first region. The detection line is connected between the two signal detection ends, and the detection line is arranged surrounding the first region. The two first-common-signal output ends are located between the two signal detection ends.

Optionally, the chip-on-film has two first-common-signal output ends, one signal detection end and one signal compensation end. The first-common-signal line is connected between the two first-common-signal output ends, and the first-common-signal line is arranged surrounding the first region. The detection line is connected between the signal detection end and the signal compensation end, and the detection line is arranged surrounding the first region. The two first-common-signal output end is located between the signal detection end and the signal compensation end.

Optionally, the chip on film has two first-common-signal output ends and one signal detection end, and the two first-common-signal output ends are located on a same side of the signal detection end. The first-common-signal line is connected between the two first-common-signal output ends, and the first-common-signal line is arranged surrounding the first region. The detection line is connected between the signal detection end and one of the two first-common-signal end that is far from the signal detection end, and the detection line is arranged surrounding the first region.

Optionally, the chip-on-film further has a second-common-signal output end.

The display panel also includes a color filter substrate, the color filter substrate and the array substrate are arranged in a cell-to-cell manner, the color filter substrate includes a second common electrode, and the second common electrode is configured to be coupled with each pixel electrode in the plurality of pixel electrodes to form a capacitor.

The display device also includes a second-common-signal line, the second-common-signal line is connected with both the second-common-signal output end and the second common electrode, an orthographic projection of the second-common-signal line on the base substrate has no intersections with orthographic projections of both the first-common-signal line and the detection line on the base substrate.

It can be understood that, for beneficial effects of the foregoing second aspect, reference may be made to the relevant descriptions in the foregoing first aspect, which will not be repeated here.

BRIEF DESCRIPTION OF THE DRAWINGS

In order to illustrate schemes in the embodiments of the present application more clearly, the following will briefly introduce the drawings that need to be used for describing the embodiments. Obviously, the drawings in the following description are merely some embodiments of the present application, and for those of ordinarily skills in the art, other drawings can also be obtained according to these drawings without any creative effort.

DETAILED DESCRIPTION

In order to make the objectives, schemes and beneficial effects of the present application more comprehensible, implementations of the present application will be further described in detail below with reference to the drawings.

It should be understood that the phrase "a/the plurality of" mentioned in the present application refers to two or more. In the description of the present application, unless otherwise stated, the symbol "I" means "or", for example, A/B means A or B. The expression "and/or" in here is only an association relationship that describes the associated objects, which means that three kinds of relationships can be included, for example, an expression of A and/or B may mean that A is existed alone, A and B are both existed, and B is existed alone. In addition, to facilitate the description of the schemes in the present application, words such as "first" and "second" are used to distinguish the same items or similar items having basically the same function and effect. It should be understood for those skilled artisans that the words "first", "second" and the like do not limit the quantity and execution order, and the words "first", "second" and the like are not necessarily different.

An array substrate provided by the embodiments of the present application will be explained in detail below.

Figure 1:
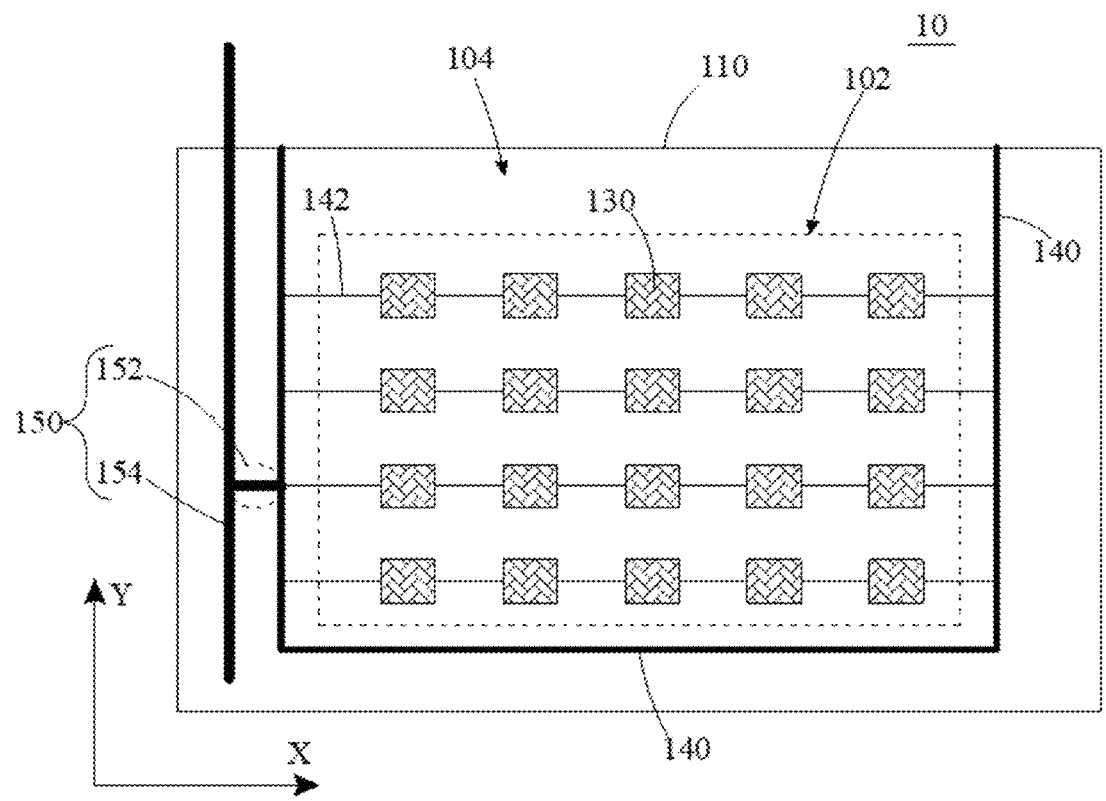
FIG. 1 is a schematic top-view structural diagram of a first type of array substrate in accordance with an embodiment of the present application.

FIG. 1 is a schematic top-view structural diagram of an array substrate 10 according to an embodiment of the present application. As shown in FIG. 1, the array substrate 10 includes: a base substrate 110; and a plurality of pixel electrodes 120, a plurality of first common electrodes 130, a first-common-signal line 140, a connection line 142 and a detection line 150, that are disposed on the base substrate 110.

Figure 2:
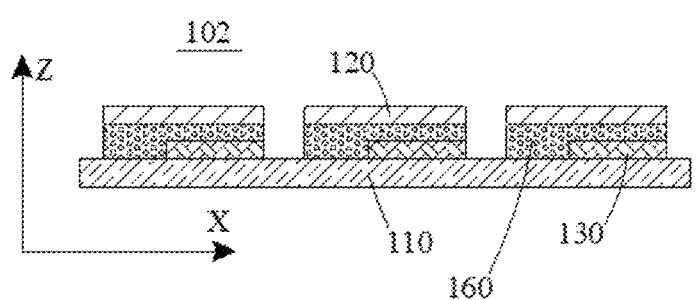
FIG. 2 is a schematic longitudinal cross-sectional structural diagram of a first region of the array substrate in accordance with an embodiment of the present application.
Figure 3:
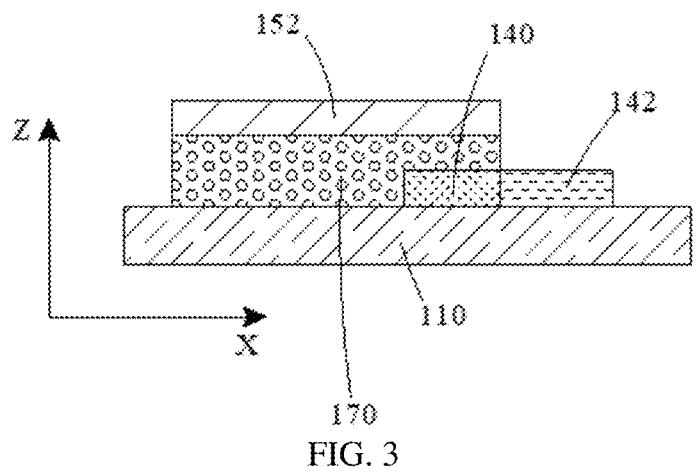
FIG. 3 is a schematic longitudinal cross-sectional structural diagram of a second region of the array substrate in accordance with an embodiment of the present application.

In more detail, FIG. 2 is a schematic longitudinal cross-sectional structural diagram of a first region 102 of the array substrate 10 according to this embodiment of the present application. FIG. 3 is a schematic longitudinal cross-sectional structural diagram of a second region 104 of the array substrate 10 according to this embodiment of the present application. As shown in FIG. 1 to FIG. 3, the base substrate 110 is configured to carry other components of the array substrate 10, such as the pixel electrodes 120, the first common electrodes 130, the first-common-signal line 140, the connection line 142 and the detection line 150, etc. The base substrate 110 is generally a transparent glass substrate. In general, the pixel electrodes 120, the first common electrodes 130, the first-common-signal line 140, the connection line 142 and the detection line 150 are all located on the same surface of the base substrate 110. In the embodiment shown in FIGS. 1 to 3, a first direction X, a second direction Y and a third direction Z are included, the first direction X and the second direction Y are extending directions of the base substrate 110. That is, the base substrate 110 is extended on a plane where the first direction X and the second direction Y are located. The third direction Z is a thickness direction of the base substrate 110 and also a thickness direction of the array substrate 10. The first direction X, the second direction Y and the third direction Z are perpendicular to each other. In the embodiment of the present application, along the extending directions of the base substrate 110, the array substrate 10 includes a first region 102 and a second region 104 surrounding the first region 102. The first region 102 of the array substrate 10 corresponds to a light emitting area of a display panel 210, and the second region 104 of the array substrate 10 corresponds to a non-light emitting area of the display panel 210, when the array substrate 10 is applied to the display panel 210.

The plurality of pixel electrodes 120 are located in the first region 102, and the plurality of pixel electrodes 120 are generally arranged in an array of multiple rows and multiple columns. When the array substrate 10 is in operation, each pixel electrode 120 is configured for inputting voltage. For convenience of description, the voltage input from the pixel electrode 120 is referred to as a drive signal.

The number of the first common electrodes 130 is generally the same as the number of the pixel electrodes 120. In the embodiment of FIG. 1, the positions and arrangement of the plurality of first common electrodes 130 are shown. As shown in FIG. 1, the plurality of first common electrodes 130 are also located in the first region 102, and the plurality of first common electrodes 130 may also be arranged in an array of multiple rows and columns, so that each first common electrode 130 is located at a position corresponding to that of each pixel electrode 120. In this case, the position of each first common electrode 130 relative to each pixel electrode 120 may be as shown in FIG. 2, the first common electrodes 130 and the pixel electrodes 120 are arranged in a one-to-one correspondence, and an insulation layer 160 is provided between each first common electrode 130 and the corresponding pixel electrode 120, so that each first common electrode 130 is coupled with one pixel electrode 120 to form a capacitor. During an operation of the array substrate 10, the capacitor formed due to the coupling of the first common electrode 130 and the pixel electrode 120 enables a voltage at the pixel electrode 120 to remain unchanged. That is, the first common electrode 130 is a common electrode of the array substrate. Each of the first common electrodes 130 is configured for inputting voltage when the array substrate 10 is in operation. For the convenience of description, the voltage input from the first common electrode 130 is referred to as a first common signal. Generally, the first common signal of the array substrate 10 should be stable and invariant.

The first-common-signal line 140 and the connection line 142 are metal wires. The first-common-signal line 140 is located in the second region 104. The first-common-signal line 140 is configured for outputting a first common signal when the array substrate 10 is in operation. The connection lines 142 is connected between the first-common-signal line 140 and the plurality of first common electrodes 130, thereby enabling the first common signal to be output to the plurality of first common electrodes 130 when the first common signal is output from the first-common-signal line 140. It should be noted that, in the embodiment shown in FIG. 1, the array substrate 10 includes a plurality of connection lines 142 for connecting the first-common-signal line 140 to the plurality of first common electrodes 130. In some other embodiments, the array substrate 10 may also include only one connection line 142 for connecting the first-common-signal line 140 to the plurality of first common electrodes 130. In some embodiments, the first-common-signal line 140 and the connection line 142 are integrally formed in one metal wire.

The detection line 150 may also be a metal wire. A portion of the detection line 150 is located in the second region 104, and the other portion of the detection line 150 is extended outside the base substrate 110. In the embodiment of FIG. 3, the positional relationship between the detection line 150 and the first-common-signal line 140 is shown, and the detection line 150 and the first-common-signal line 140 are insulated from each other. Meanwhile, as shown in FIG. 1 and FIG. 3, the orthographic projection of the detection line 150 on the base substrate 110 (i.e., the projection of the detection line 150 on the base substrate 110 along the third direction Z) and the orthographic projection of the first-common-signal line 140 on the base substrate 110 (i.e., the projection of the first-common-signal line 140 on the base substrate 110 along the third direction Z) has at least one intersection point. In some embodiments, as shown in FIG. 3, the array substrate 10 also includes an insulator 170. The insulator 170 is located between the detection line 150 and the first-common-signal line 140 at a position where the orthographic projections of the detection line 150 and the first-common-signal line 140 intersect along the third direction Z, so that the detection line 150 and the first-common-signal line 140 are insulated from each other through the insulator 170. In this case, when the insulator 170, the detection line 150 and the first-common-signal line 140 are molten by subjecting the array substrate 10 to a laser irradiation along the third direction Z, the molten detection line 150 and first-common-signal line 140 will be short-circuited at the position where the orthographic projections of the two intersect. In other embodiments, the detection line 150 may also be spaced apart from the first-common-signal line 140 along the third direction Z, to isolate the detection line 150 from the first-common-signal line 140 from each other. In this case, when the detection line 150 and/or the first-common-signal line 140 are molten by subjecting the array substrate 10 to the laser irradiation along the third direction Z, the molten detection line 150 and first-common-signal line 140 will be short-circuited at the position where the orthographic projections of the two intersect.

Figure 4:
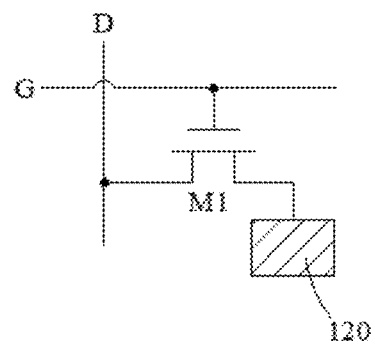
FIG. 4 is a schematic structural diagram of a connection circuit of a pixel electrode in accordance with an embodiment of the present application.

FIG. 4 is a schematic structural diagram of a connection circuit of a pixel electrode 120 according to an embodiment of the present application. As shown in FIG. 4, the pixel electrode 120 is connected with a switch M1. The switch M1 here may be a thin film transistor (TFT) such as a metal oxide semiconductor (MOS) field effect transistor. The switch M1 has an input end, an output end and a control end. The output end of the switch M1 is connected to the pixel electrode 120. The control end of the switch M1 is connected to a scan line G. The input end of the switch M1 is connected to a data line D. When the array substrate 10 is in operation, for any one of the pixel electrodes 120 in the array substrate 10, the switch M1 is switched on when a scan signal is output from the scan line G, meanwhile, a drive signal from the data line D is output to the pixel electrode 120 through the switch M1.

A complete operation process of the array substrate 10 according to an embodiment of the present application is as follows: when the array substrate 10 is in operation, each pixel electrode 120 receives a drive signal from the data line D connected through the switch M1. Meanwhile, a first common signal from the first-common-signal line 140 is output to each of the first common electrodes 130 through the connection line 142. At this time, each first common electrode 130 is coupled with the corresponding pixel electrode 120 to form a capacitor, so that a stable drive signal on each pixel electrode 120 is maintained. During this process, when a voltage variation at the first common electrode 130 needs to be detected, the array substrate 10 can be irradiated through a laser along the third direction Z, to enable the detection line 150 and the first-common-signal line 140 to be short-circuited at the position where the orthographic projections of the two intersect, so that the voltage variation at the first common electrode 130 is transmitted to the detection line 150. The voltage variation at the first common electrode 130 can be obtained by detecting the voltage variation of the detection line 150 outside the base substrate 110. When the voltage variation at the first common electrode 130 does not need to be detected, the connection between the detection line 150 and the first-common-signal line 140 can also be disconnected by laser irradiation.

Figure 5:
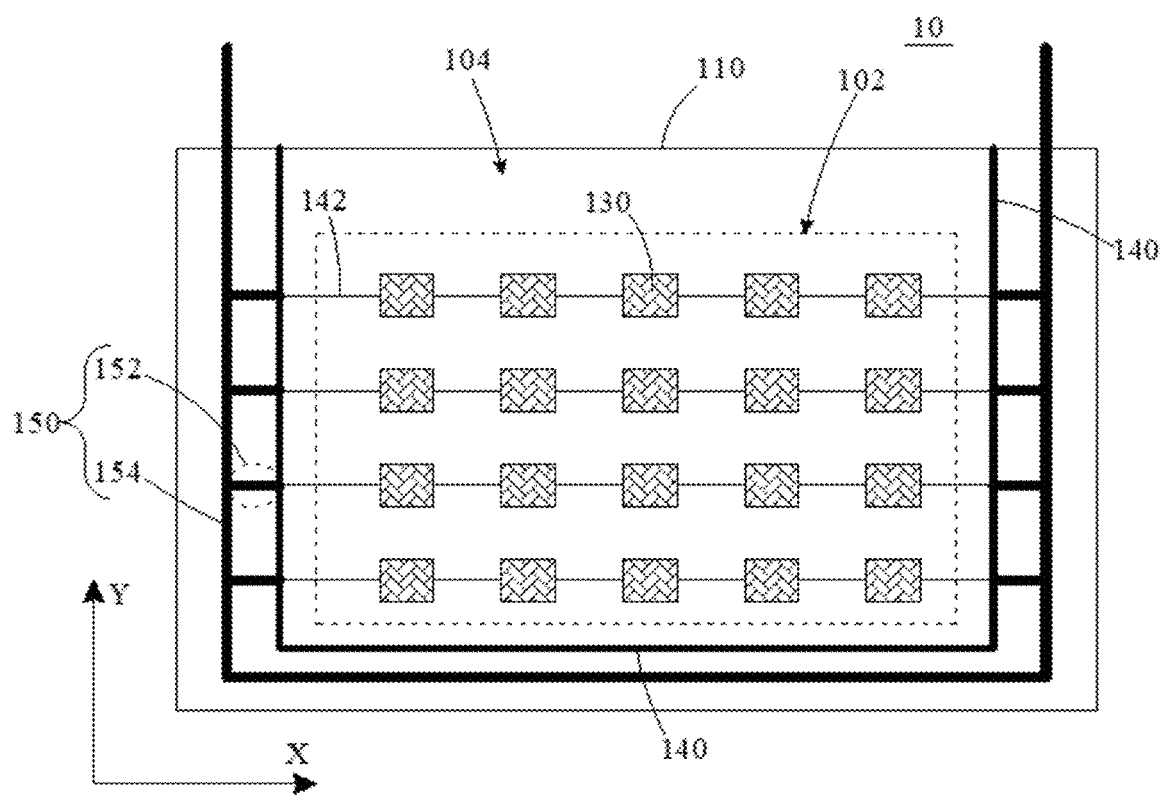
FIG. 5 is a schematic top-view structural diagram of the first type of array substrate in accordance with another embodiment of the present application.

In the embodiment of FIG. 1, it is shown that the orthographic projection of the detection line 150 on the base substrate 110 and the orthographic projection of the first-common-signal line 140 on the base substrate 110 have an intersection point. FIG. 5 is a schematic top-view structural diagram of an array substrate 10 according to another embodiment of the present application, as shown in FIG. 5, the orthographic projection of the detection line 150 on the base substrate 110 and the orthographic projection of the first-common-signal line 140 on the base substrate 110 has multiple intersection points.

In some embodiments, as shown in FIG. 5, the orthographic projection of the detection line 150 on the base substrate 110 and the orthographic projection of the first-common-signal line 140 on the base substrate 110 do not overlap with each other. That is, the detection line 150 and the first-common-signal line 140 are not on the same plane along the third direction Z. In this way, the intersection of the first-common-signal line 140 and the first conductive part 154 along the third direction Z, due to which the parasitic capacitance is caused, can be avoided.

In some embodiments, as shown in FIG. 5, the array substrate 10 includes a plurality of connection lines 142, a first end of each of the plurality of connection line 142 is connected with the first-common-signal line 140, and a second end of each of the plurality of connection lines 142 is connected with the first common electrode 130. That is, the plurality of first common electrodes 130 are connected to the first-common-signal lines 140 through the plurality of connection lines 142, respectively. Here, the number of the connection lines 142 may be less than or equal to the number of the first common electrodes 130. That is, one connection line 142 may be connected with a plurality of first common electrodes 130. For example, when the plurality of first common electrodes 130 are arranged in an array, one connection line 142 may be connected with the first common electrodes 130 in a row or the first common electrodes 130 in a column.

The detection line 150 may include a first conductive part 154 and at least one second conductive part 152. A portion of the first conductive part 154 is located in the second region 104, and the other portion of the first conductive part 154 is extended outside the base substrate 110. A first end of each second conductive part 152 is connected with the first conductive part 154, and a second end of each second conductive part 152 is configured to be coincided with the orthographic projection of the first end of each connection line 142 on the base substrate 110. Since the first end of each connection line 142 is connected with the first-common-signal line 140, the second end of each second conductive part 152 is also configured to intersect with the orthographic projection of the first-common-signal line 140 on the base substrate 110. That is, in this exemplary embodiment, the detection line 150 is divided into a first conductive part 154 and a second conductive part 152. The first conductive part 154 is a trunk line of the detection line 150 and is connected with a plurality of second conductive parts 152, and the second conductive parts 152 are branch lines of the detection line 150. The orthographic projection of each second conductive part 152 on the base substrate 110 and the orthographic projection of the first-common-signal line 140 on the base substrate 110 has an intersection point, i.e., the orthographic projection of an intersection of the first-common-signal line 140 and one connection line 142 on the base substrate 110. In this way, when one second conductive part 152 and the first-common-signal line 140 are short-circuited at the position where the orthographic projections of the two intersect, the voltage variation at the first common electrode 130 can be detected by the detection line 150. When different second conductive parts 152 are short-circuited with the first-common-signal line 140, voltage variations of the first common electrodes 130 at different positions can be detected through the detection line 150.

In some embodiments, when the detection line 150 includes a plurality of second conductive parts 152, any two adjacent second conductive parts 152 has the same distance along an arrangement direction of the plurality of second conductive parts 152. For example, in the embodiment shown in FIG. 5, the first conductive part 154 is extended along the second direction Y, and each of the second conductive parts 152 is extended along the first direction X. The plurality of second conductive parts 152 are distributed in two columns. For each column of the second conductive parts 152, the arrangement direction is the second direction Y, and every two adjacent second conductive parts 152 has the same distance along the second direction Y. In this way, when different second conductive parts 152 are short-circuited with the first-common-signal line 140 one by one, the voltage variations of the first common electrodes 130 at different positions can be uniformly detected through the detection line 150.

Figure 6:
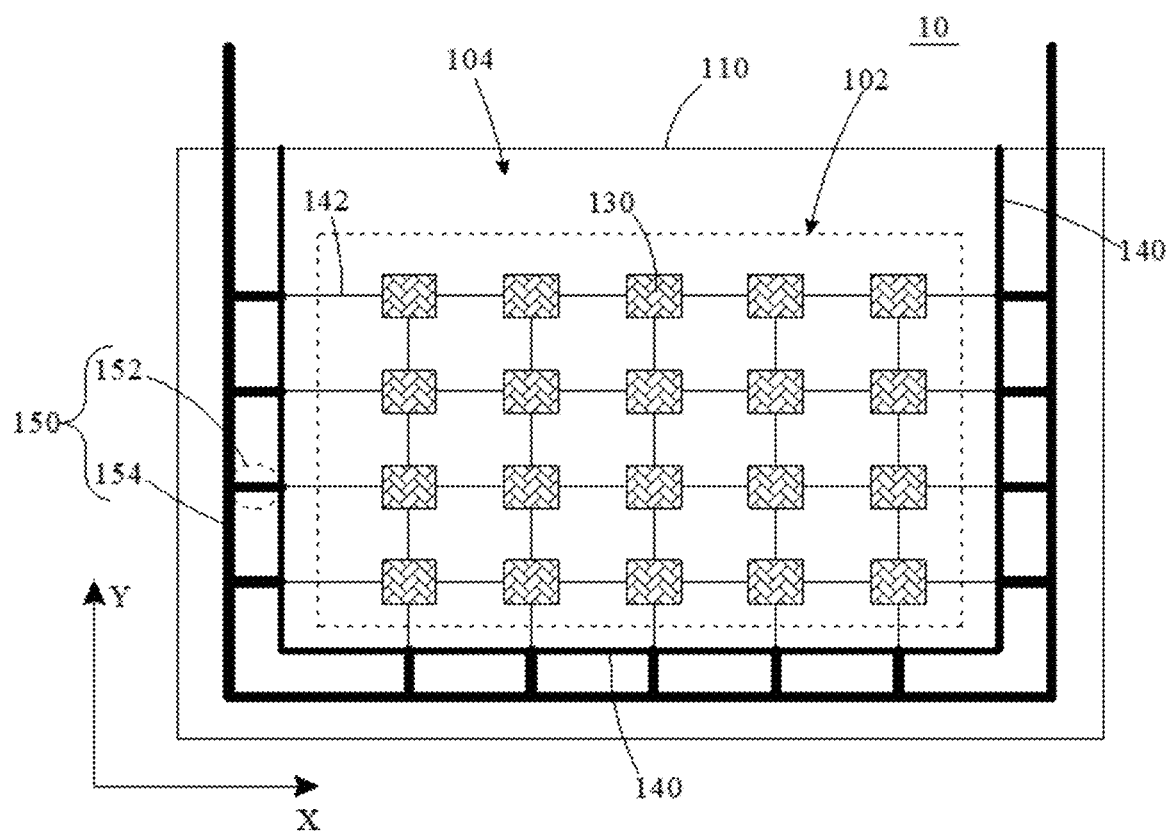
FIG. 6 is a schematic top-view structural diagram of a second type of array substrate in accordance with another embodiment of the present application.

It can be understood that, in the embodiment shown in FIG. 5, one connection line 142 is configured to be connected with the first common electrodes 130 in a row, that is, a plurality of connection lines 142 are arranged along the second direction Y (column direction), so the second conductive parts 152 are also correspondingly arranged along the second direction Y. In some other embodiments, as shown in FIG. 6, a part of the connection lines 142 are configured to be connected with the first common electrodes 130 in a row, and the other part of the connection lines 142 are configured to be connected with the first common electrodes 130 in a column, that is, the other parts of the connection lines 142 are arranged in line along the first direction X. Based on this, the arrangement direction of the plurality of second conductive parts 152 also includes the first direction X and the second direction Y. The second end of each of the plurality of second conductive parts 152 arranged along the first direction X is coincided with the orthographic projection of the first end of one connection wire 142 (among the plurality of connection wires 142 arranged along the first direction X) on the base substrate 110. The second end of each of the plurality of second conductive parts 152 arranged along the second direction Y is coincided with the orthographic projection of the first end of one connection wire 142 (among the plurality of connection wires 142 arranged along the second direction Y) on the base substrate 110. Distances between any two adjacent second conductive parts 152 in the plurality of second conductive parts 152 arranged along the first direction X are equal, and distances between any two adjacent second conductive parts 152 in the plurality of second conductive parts 152 arranged in the second direction Y are also equal.

In some embodiments, an extending direction of the first conductive part 154 is the same as that of the first-common-signal line 140. As shown in FIG. 5 or FIG. 6, the extending direction of the first-common-signal line 140 includes the first direction X and the second direction Y, and the extending direction of the first conductive part 154 also includes the first direction X and the second direction Y. That is, the first conductive part 154 is parallel to the first-common-signal line 140, so that the intersection of the first-common-signal line 140 and the first conductive part 154 along the third direction Z, due to which the parasitic capacitance is caused, can be avoided. Generally, the orthographic projection of the first-common-signal line 140 on the base substrate 110 is located between the orthographic projection of the first conductive part 154 on the base substrate 110 and the first region 102. In this way, the orthographic projection of the first conductive part 154 on the base substrate 110 can be prevented from intersecting with the orthographic projection of the connection line 142 on the base substrate 110, thereby the intersection of the first conductive part 154 and the connection line 142 along the third direction Z, due to which the parasitic capacitance is caused, is avoided.

Figure 7:
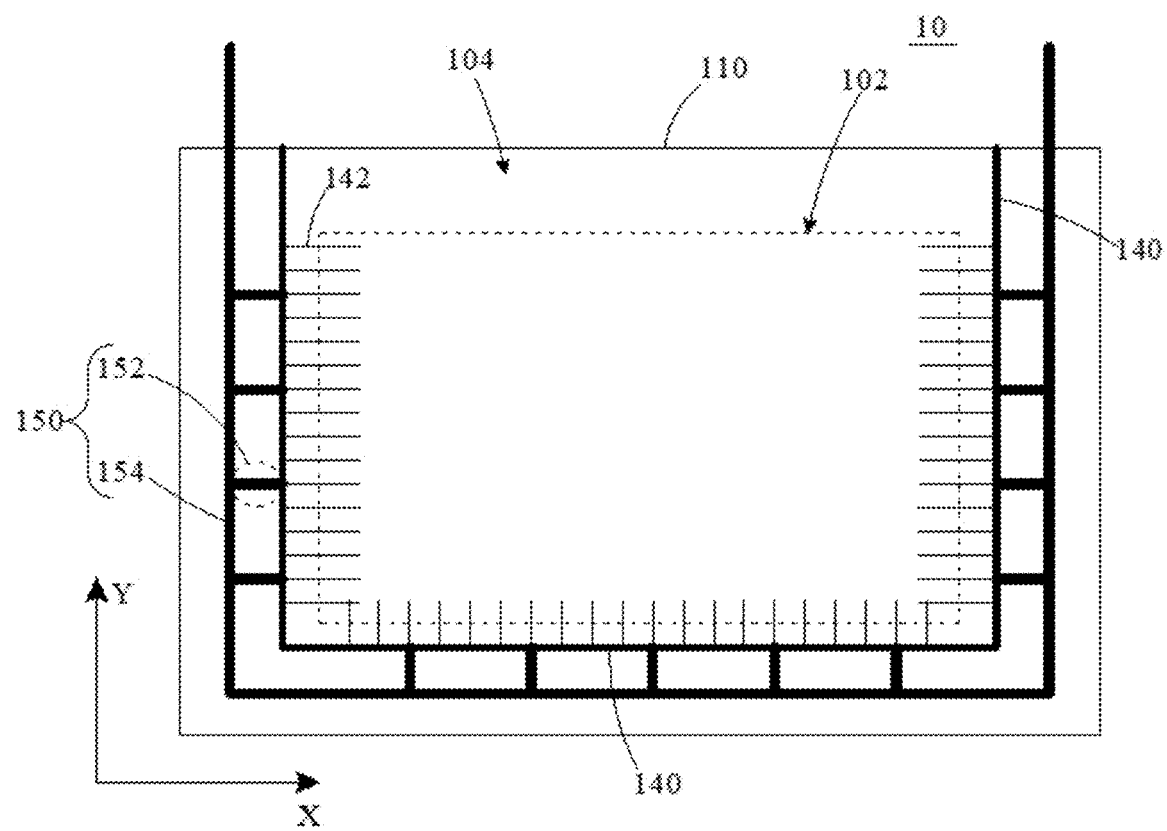
FIG. 7 is a schematic top-view structural diagram of a third type of array substrate in accordance with another embodiment of the present application.

It should be noted that, in the embodiment shown in FIG. 6, it is only symbolically shown that the array substrate 10 has the first common electrodes 130 in 4 rows and 5 columns, and each row of common electrodes and each column of common electrodes are correspondingly provided with the second conductive parts 152 for detecting the voltage variation at the first common electrode 130. In fact, the number of the first common electrodes 130 in the array substrate 10 is quite large. For example, for a display panel 210 with a resolution of 1920×1080, the first common electrodes 130 in the array substrate 10 are generally arranged in 1080 rows and 1920×3 columns. In this case, as shown in FIG. 7 (the first common electrode 130 is not shown, it can be understood that each connection line 142 extending along the first direction X is connected to the first common electrodes 130 in a row, and each connection lines 142 extending along the second direction Y are connected to the first common electrodes 130 in a column). If the number of connection lines 142 is relatively large, the second conductive parts 152 may be provided at intervals of several connection lines 142 or at intervals of several distances.

A display device 20 provided by the embodiments of the present application will be explained in detail below.

Figure 8:
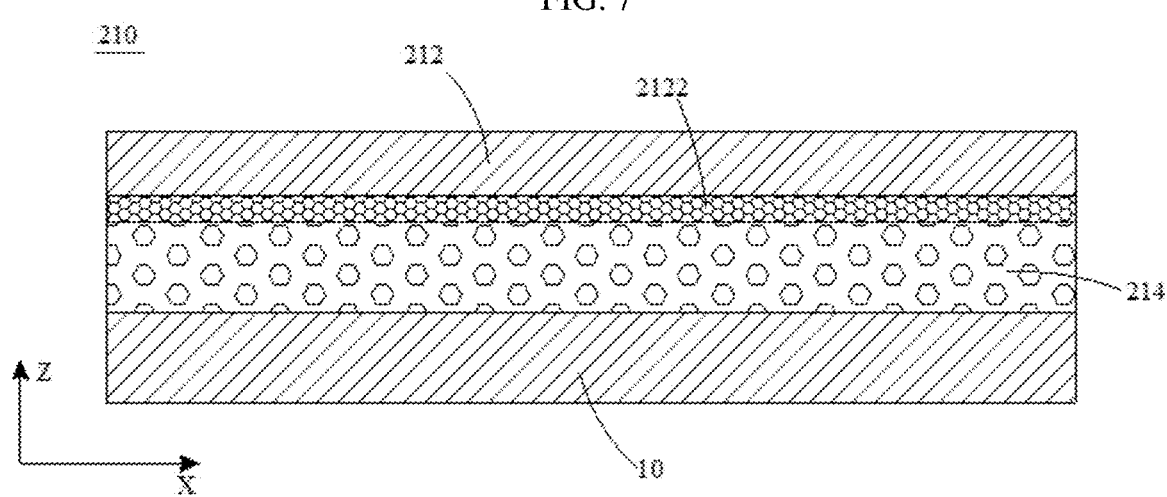
FIG. 8 is a schematic structural diagram of a display panel in accordance with an embodiment of the present application.

FIG. 8 is a schematic structural diagram of a display panel 210 according to an embodiment of the present application. As shown in FIG. 8, the display panel 210 includes a color filter substrate 212, a liquid crystal layer 214, and the array substrate 10 as described in any one of the above embodiments. The color filter substrate 212 and the array substrate 10 are arranged in a cell-to-cell manner, and a side of the color filter substrate 212 adjacent to the array substrate 10 has a second common electrode 2122. The second common electrode 2122 is configured to form a capacitor with each of the plurality of pixel electrodes 120. The liquid crystal layer 214 may include a plurality of liquid crystal units, each of the plurality of liquid crystal units is located between one pixel electrode 120 and the second common electrode 2122. In this way, the liquid crystal unit between the pixel electrode 120 and the second common electrode 2122 will be rotated when a voltage difference is existed between the pixel electrode 120 and the second common electrode 2122, thereby enabling the display panel 210 to achieve a display effect. That is, the second common electrode 2122 is the common electrode of the color filter substrate.

In some embodiments, the array substrate 10 includes: a base substrate 110; and a plurality of pixel electrodes 120, a plurality of first common electrodes 130, a first-common-signal line 140 and a connection line 142, that are disposed on the base substrate 110. The array substrate 10 includes a first region 102 and a second region 104 surrounding the first region 102 along an extending direction of the base substrate 110. The plurality of pixel electrodes 120 and the plurality of first common electrodes 130 are located in the first region 102, and one of the plurality of first common electrodes 130 is configured to be coupled with one of the plurality of pixel electrodes 120 to form a capacitor. The first-common-signal line 140 is located in the second region 104, a first end of the connection line 142 is connected with the first-common-signal line 140, and a second end of the connection line 142 is connected with the plurality of first common electrodes 130. The array substrate 10 also includes: a detection line 150, a portion of the detection line 150 is located in the second region 104, the other portion of the detection line 150 is extended outside the base substrate 110. The detection line 150 and the first-common-signal line 140 are insulated from each other, and the orthographic projection of the detection line 150 on the base substrate 110 and the orthographic projection of the first-common-signal line 140 on the base substrate 110 have at least one intersection point.

In some embodiments, the orthographic projection of the detection line 150 on the base substrate 110 and the orthographic projection of the first-common-signal line 140 on the base substrate 110 do not overlap with each other.

In some embodiments, the array substrate 10 includes a plurality of connection lines 142. The first end of each of the plurality of connection lines 142 is connected with the first-common-signal line 140, and the second end of each of the plurality of connection lines 142 is connected with the first common electrode 130. The detection line 150 includes a first conductive part 154 and at least one second conductive part 152. A portion of the first conductive part 154 is located in the second region 104, and the other portion of the first conductive part 154 is extended outside the base substrate 110. The first end of each of the at least one second conductive part 152 is connected with the first conductive part 154. The orthographic projection of the second end of each of the at least one second conductive part 152 on the base substrate 110 is coincided with the orthographic projection of the first end of one of the plurality of connection lines 142 on the base substrate 110.

In some embodiments, the detection line 150 includes a plurality of second conductive parts 152, and along the arrangement direction of the plurality of second conductive parts 152, the distances between any two adjacent second conductive parts 152 are equal.

In some embodiments, the extending direction of the first conductive part 154 is the same as the extending direction of the first-common-signal line 140.

In some embodiments, the orthographic projection of the first-common-signal line 140 on the base substrate 110 is located between the orthographic projection of the first conductive part 154 on the base substrate 110 and the first region 102.

In some embodiments, the array substrate 10 also includes an insulator 170, and the insulator 170 is located between the detection line 150 and the first-common-signal line 140, to enable the detection line 150 and the first-common-signal line 140 to be insulated from each other.

Figure 9:
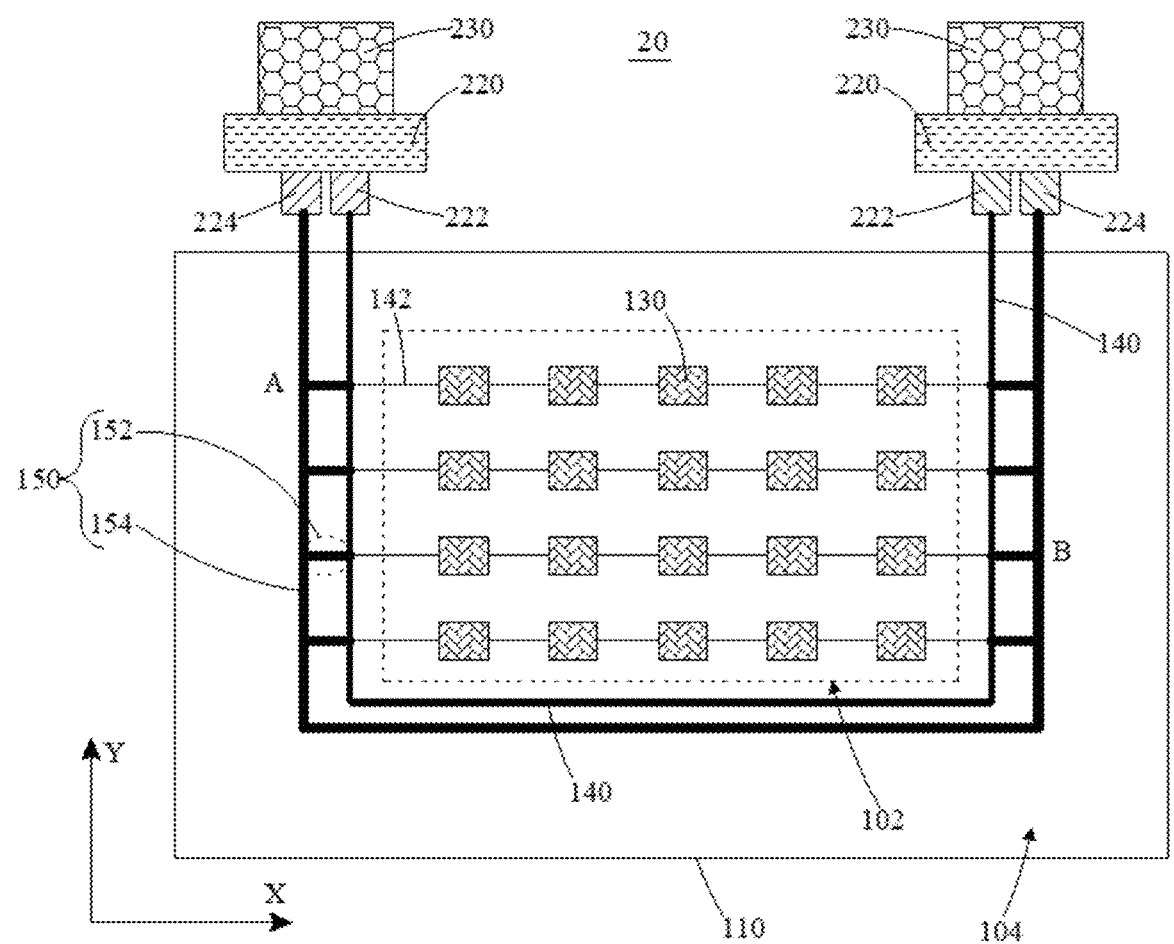
FIG. 9 is a schematic structural diagram of a first type of display device in accordance with yet another embodiment of the present application.

FIG. 9 is a schematic structural diagram of a display device 20 according to an embodiment of the present application. As shown in FIG. 9, an embodiment of the present application also provides a display device 20, which includes a display panel 210 as shown in FIG. 8, a chip on film 220 and a driver 230.

The chip on film (COF) 220 refers to a flexible circuit board that can be packaged with chips. The driver 230 is a chip that can be used to output the drive signal, the scan signal and the first common signal. The chip on film 220 is used to provide an electrical connection between the display panel 210 and the driver 230, so that each of a plurality of drive lines is connected to the driver 230 through the chip on film 220. In some other embodiments, the driver 230 may also be located on a printed circuit board, and the chip on film 220 is connected to the driver 230 through the printed circuit board, so that each of the plurality of drive lines is connected with the driver through the chip on film 220 and the printed circuit board.

The chip on film 220 has a first-common-signal output end 222, and the first-common-signal output end 222 may be connected to the driver 230, so that the first common signal is output from the first-common-signal output end 222 when the driver 230 is in operation. The first-common-signal line 140 in the array substrate 10 is connected with the first-common-signal output end 222. In this way, the first common signal output by the driver 230, when the driver 230 is in operation, can be output to each of the first common electrodes 130 through the first-common-signal output end 222, the first-common-signal line 140 and the connection line 142.

The chip on film 220 also has a signal detection end 224, and the other portion of the detection line 150 that is extended outside the base substrate 110 is connected with the signal detection end 224. In this way, when the voltage variation at the first common electrode 130 needs to be detected, the array substrate 10 can be irradiated through a laser, so that the detection line 150 and the first-common-signal line 140 are short-circuited at the position where the orthographic projections of the two intersect, thereby the voltage variation at the first common electrode 130 is transmitted to the detection line 150. In this case, the voltage variation at the first common electrode 130 can be detected at the signal detection end 224.

In some embodiments, as shown in FIG. 9, the chip on film 220 has two first-common-signal output ends 222 and two signal detection ends 224. The first-common-signal line 140 is connected between the two first-common-signal output ends 222, and is arranged surrounding the first region 102. The detection line 150 is connected between the two signal detection ends 224, and is arranged surrounding the first region 102. Meanwhile, the two first-common-signal output ends 222 are located between the two signal detection ends 224 along the first direction X. In this way, the orthographic projection of the first-common-signal line 140 on the base substrate 110 can be located between the orthographic projection of the first conductive part 154 on the base substrate 110 and the first region 102, thereby the intersection of the first-common-signal line 140 and the first conductive part 154 along the third direction Z, due to which the parasitic capacitance is caused, can be avoided.

In this embodiment, when the display device 20 is in operation, the voltage variations of the first common electrodes 130 at two positions may be detected at the same time. For example, all the second conductive parts 152 shown in FIG. 9 are respectively referred to, by position, as a first one of the second conductive part 152 (located at the top along the second direction Y) in a first column (located on the left-side columns along the first direction X), a second one of the second conductive parts 152 in the first column a third one of the second conductive parts 152 in a second column and a fourth one of the second conductive parts 152 (located at the bottom in the second direction Y) in the second column (located on the right-side columns along the first direction X). When the voltage variations of the first common electrodes 130 in the first row and the third row need to be detected at the same time, the first one of the second conductive parts 152 in the first column and the first-common-signal line 140 are enabled to be short-circuited, through the laser irritation, at the position where the orthographic projections of the two intersect, and also, the third one of the second conductive part 152 in the second column and the first-common-signal line 140 are enabled to be short-circuited, through the laser irritation, at the position where the orthographic projections of the two intersect. The joint point of the first conductive part 154 and the first one of the second conductive parts 152 in the first column is referred to as point A, and the joint point of the first conductive part 154 and the third one of the second conductive parts 152 in the second column is referred to as point B. Then, the first conductive part 154 is enabled to be disconnected at point A and point B through the laser irritation, so that the voltage variation of the first common electrodes 130 in the first row can be detected at the signal detection end 224 located on the left side, and the voltage variation of the first common electrodes 130 in the third row can be detected at the signal detection end 224 located on the right side.

Figure 10:
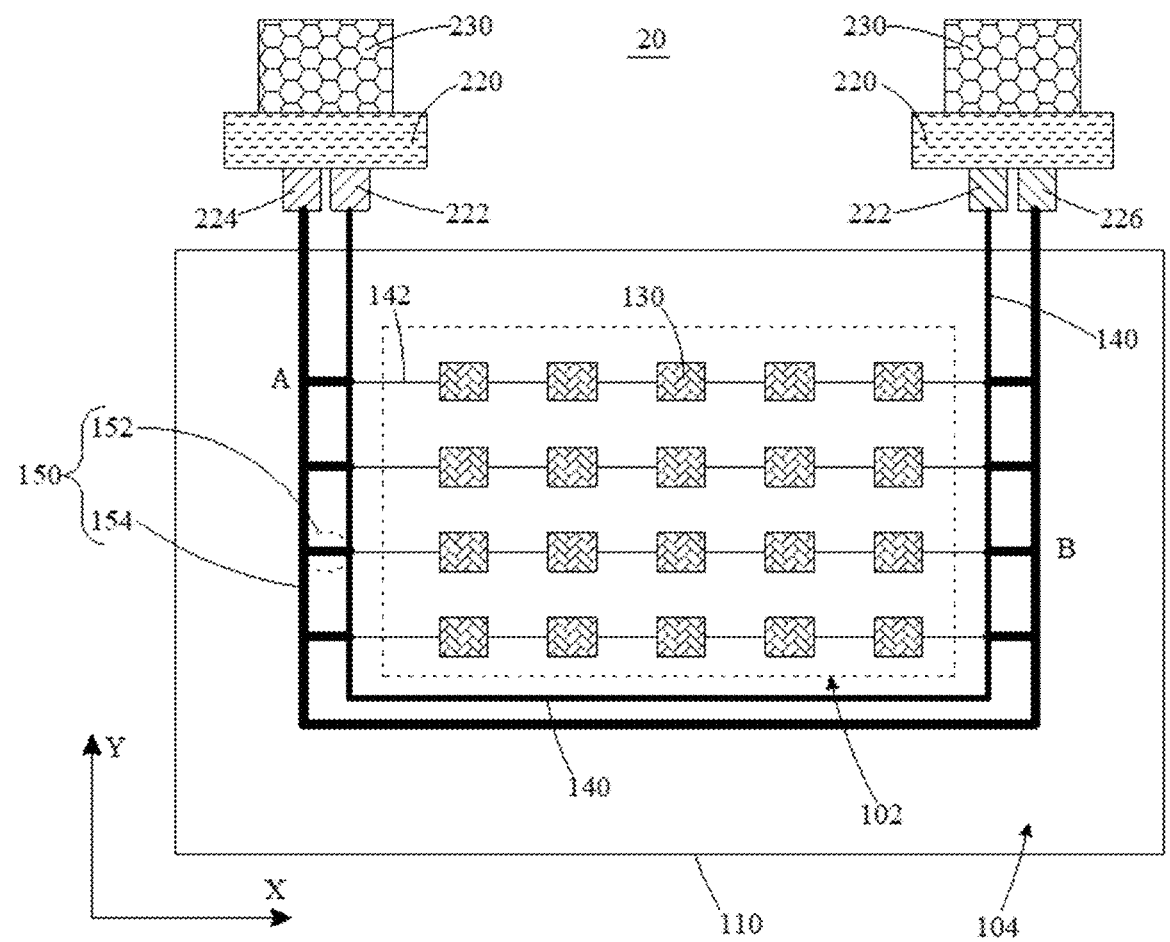
FIG. 10 is a schematic structural diagram of a second type of display device in accordance with yet another embodiment of the present application.

In some embodiments, as shown in FIG. 10, the chip on film 220 has two first-common-signal output ends 222, one signal detection end 224 and one signal compensation end 226. In this case, the driver 230 is a chip that can also be used to output a compensation signal. The signal compensation end 226 is connected to the driver 230, thereby enabling the compensation signal to be output from the signal compensation end 226 when the driver 230 is in operation. Generally, the magnitude of the compensation signal relative to the first common signal is opposite to the jump magnitude of the first common signal. In more detail, when the first common signal should remain unchanged at 0V, and the first common signal is jumped to −2V (that is lower than 0V) due to the influence of the parasitic capacitance if the drive signal is output from the drive line, the compensation signal may be 2V or 3V (higher than 0V). On the contrary, when the first common signal should be maintained at 0V, and the first common signal is jumped to 2V (that is higher than 0V) due to the influence of the parasitic capacitance if the drive signal is output from the drive line, the compensation signal may be −2V (lower than 0V).

The first-common-signal line 140 is connected between the two first-common-signal output ends 222, and is arranged surrounding the first region 102. The detection line 150 is connected between the signal detection end 224 and the signal compensation end 226, and is arranged surrounding the first region 102. Meanwhile, the two first-common-signal output ends 222 are located between the signal detection end 224 and the signal compensation end 226 along the first direction X. In this way, the orthographic projection of the first-common-signal line 140 on the base substrate 110 can be located between the orthographic projection of the first conductive part 154 on the base substrate 110 and the first region 102, thereby the intersection of the first-common-signal line 140 and the first conductive part 154 along the third direction Z, due to which the parasitic capacitance is caused, can be avoided.

In this embodiment, when the display device 20 is in operation, the voltage variation at the first common electrode 130 can be detected and compensated simultaneously. For example, all the second conductive parts 152 shown in FIG. 10 are respectively referred to, by position, as a first one of the second conductive part 152 (located at the top along the second direction Y) in a first column (located on the left-side columns along the first direction X), a second one of the second conductive parts 152 in the first column a third one of the second conductive parts 152 in a second column and a fourth one of the second conductive parts 152 (located at the bottom in the second direction Y) in the second column (located on the right-side columns along the first direction X). When the voltage variation of the first common electrodes 130 needs to be detected and compensated, the first one of the second conductive parts 152 in the first column and the first-common-signal line 140 are enabled to be short-circuited, through the laser irritation, at the position where the orthographic projections of the two intersect, and also, the third one of the second conductive part 152 in the second column and the first-common-signal line 140 are enabled to be short-circuited, through the laser irritation, at the position where the orthographic projections of the two intersect. The joint point of the first conductive part 154 and the first one of the second conductive parts 152 in the first column is referred to as point A, and the joint point of the first conductive part 154 and the third one of the second conductive parts 152 in the second column is referred to as point B. Then, the first conductive part 154 is enabled to be disconnected at point A and point B through the laser irritation, so that the voltage variation of the first common electrodes 130 can be detected at the signal detection end 224, and the voltage variation of the first common electrodes 130 can be compensated at the signal compensation end 226.

Figure 11:
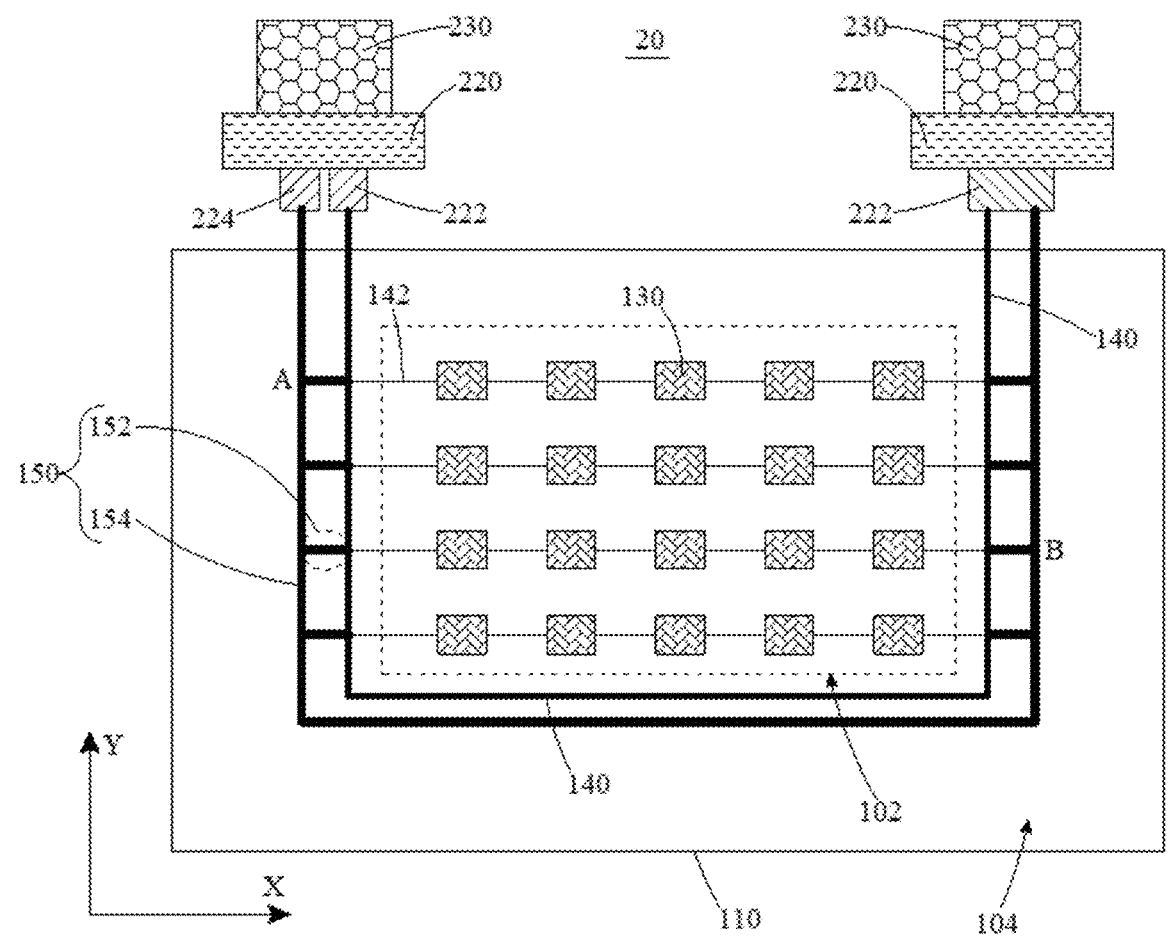
FIG. 11 is a schematic structural diagram of a third type of display device in accordance with yet another embodiment of the present application.

In some embodiments, as shown in FIG. 11, the chip on film 220 has two first-common-signal output ends 222 and one signal detection end 224. The first-common-signal line 140 is connected between the two first-common-signal output ends 222, and is arranged surrounding the first region 102. The detection line 150 is connected between the signal detection end 224 and the first-common-signal output end 222, and is arranged surrounding the first region 102. Meanwhile, the two first-common-signal output ends 222 are located on the same side of the signal detection end 224 along the first direction X. In this way, the orthographic projection of the first-common-signal line 140 on the base substrate 110 can be located between the orthographic projection of the first conductive part 154 on the base substrate 110 and the first region 102, thereby the parasitic capacitance caused due to the intersection of the first-common-signal line 140 and the first conductive part 154 along the third direction Z can be avoided.

In this embodiment, when the display device 20 is in operation, the voltage variation of the first common electrodes 130 can be detected, and a driving of the first common electrode 130 by the first common signal can be enhanced. For example, all the second conductive parts 152 shown in FIG. 11 are respectively referred to, by position, as a first one of the second conductive part 152 (located at the top along the second direction Y) in a first column (located on the left-side columns along the first direction X), a second one of the second conductive parts 152 in the first column a third one of the second conductive parts 152 in a second column and a fourth one of the second conductive parts 152 (located at the bottom in the second direction Y) in the second column (located on the right-side columns along the first direction X). When the voltage variation of the first common electrodes 130 needs to be detected and the driving of the first common electrodes 130 needs to be enhanced, the first one of the second conductive parts 152 in the first column and the first-common-signal line 140 are enabled to be short-circuited, through the laser irritation, at the position where the orthographic projections of the two intersect, and also, the third one of the second conductive part 152 in the second column and the first-common-signal line 140 are enabled to be short-circuited, through the laser irritation, at the position where the orthographic projections of the two intersect. The joint point of the first conductive part 154 and the first one of the second conductive parts 152 in the first column is referred to as point A, and the joint point of the first conductive part 154 and the third one of the second conductive parts 152 in the second column is referred to as point B. Then, the first conductive part 154 is enabled to be disconnected at point A and point B through the laser irritation, so that the voltage variation of the first common electrodes 130 can be detected at the signal detection end 224, and the driving of the first common electrode 130 can be enhanced by the first common signal at the first-common-signal output end 222 on the right side.

Figure 12:
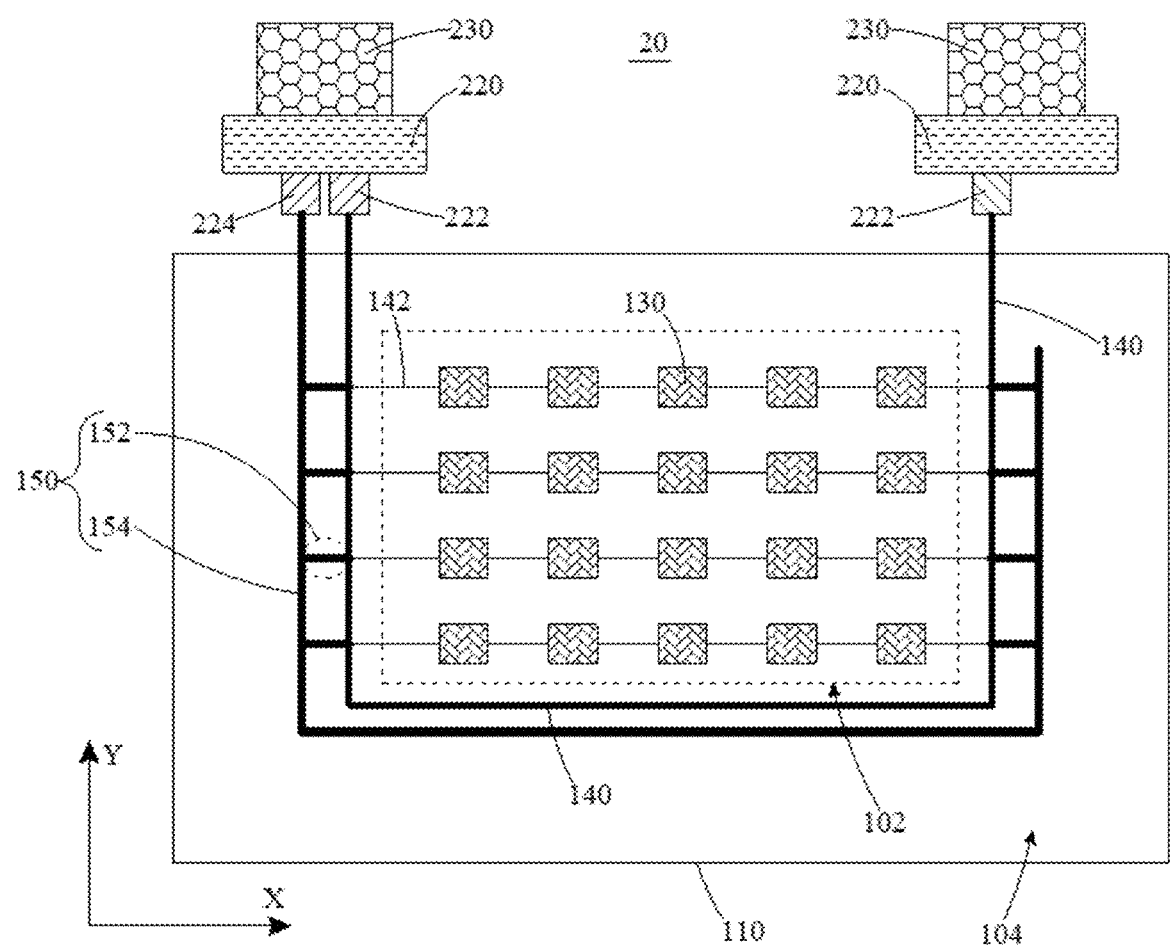
FIG. 12 is a schematic structural diagram of a fourth type of display device in accordance with yet another embodiment of the present application.

In some embodiments, as shown in FIG. 12, the chip on film 220 has two first-common-signal output ends 222 and one signal detection end 224. The first-common-signal line 140 is connected between the two first-common-signal output ends 222, and is arranged surrounding the first region 102. The detection line 150 is connected with the signal detection end 224, and may be arranged surrounding the first region 102. Meanwhile, the two first-common-signal output ends 222 are located on the same side of the signal detection end 224 along the first direction X. In this way, the orthographic projection of the first-common-signal line 140 on the base substrate 110 and the orthographic projection of the first conductive part 154 on the base substrate 110 have no intersection, thereby the intersection of the first-common-signal line 140 and the first conductive part 154 along the third direction Z, due to which the parasitic capacitance is caused, can be avoided.

In this embodiment, when the display device 20 is in operation, the voltage variation of the first common electrodes 130 can be detected. For example, all the second conductive parts 152 shown in FIG. 12 are respectively referred to, by position, as a first one of the second conductive part 152 (located at the top along the second direction Y) in a first column (located on the left-side columns along the first direction X), a second one of the second conductive parts 152 in the first column a third one of the second conductive parts 152 in a second column and a fourth one of the second conductive parts 152 (located at the bottom in the second direction Y) in the second column (located on the right-side columns along the first direction X). When the voltage variation of the first common electrodes 130 needs to be detected, the first one of the second conductive parts 152 in the first column and the first-common-signal line 140 are enabled to be short-circuited, through the laser irritation, at the position where the orthographic projections of the two intersect, and then the voltage variation of the first common electrodes 130 can be detected at the signal detection end 224.

Figure 13:
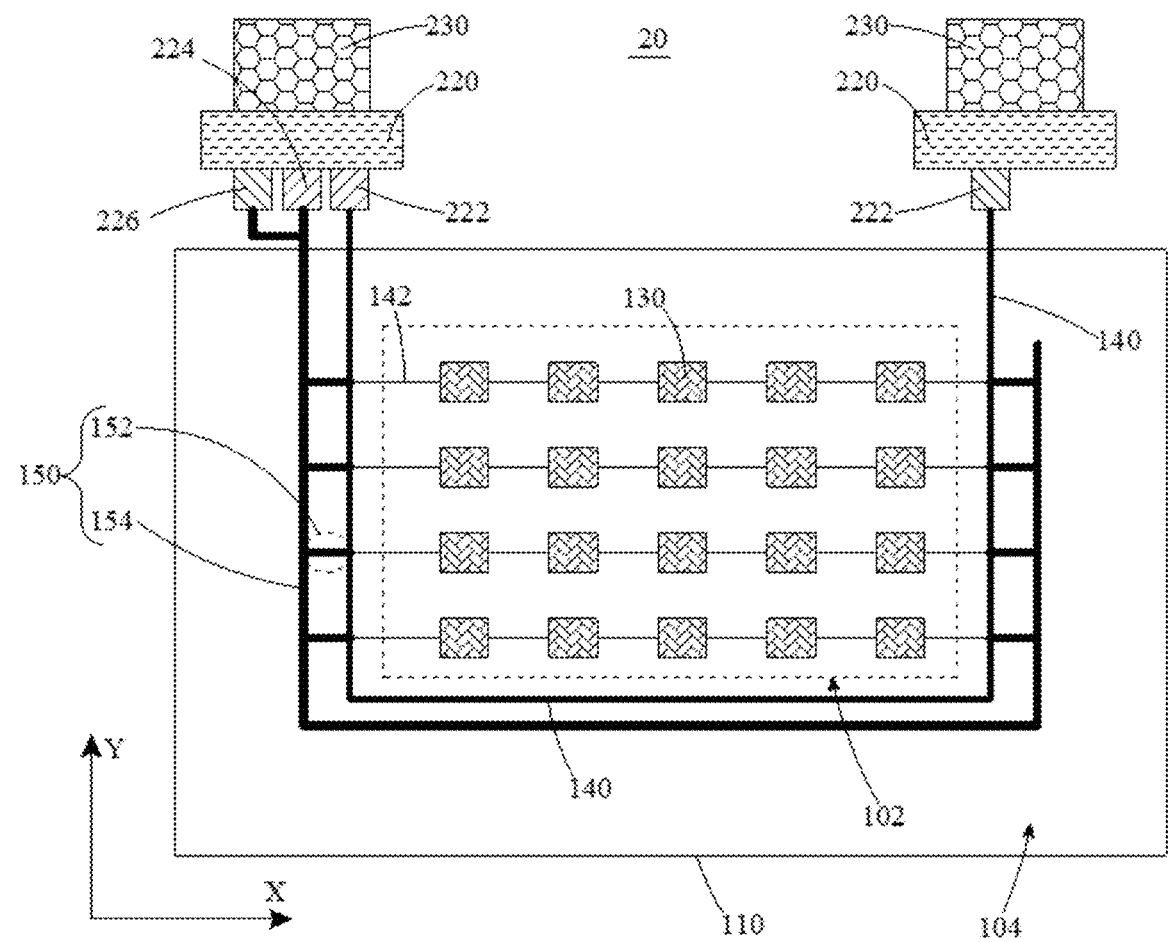
FIG. 13 is a schematic structural diagram of a fifth type of display device in accordance with yet another embodiment of the present application.

In some embodiments, as shown in FIG. 13, the chip on film 220 has two first-common-signal output ends 222, a signal detection end 224 and a signal compensation end 226. In this case, the driver 230 is a chip that can also be used to output the compensation signal. The signal compensation end 226 is connected with the driver 230, thereby enabling the compensation signal to be output from the signal compensation end 226 when the driver 230 is in operation. Generally, the magnitude of the compensation signal relative to the first common signal is opposite to the jump magnitude of the first common signal, and details are not repeated herein. The first-common-signal line 140 is connected between the two first-common-signal output ends 222, and is arranged surrounding the first region 102; one end of the first conductive part 154 of the detection line 150 is connected with both the signal detection end 224 and the signal compensation end 226. The detection line 150 may be arranged surrounding the first region 102. Meanwhile, the two first-common-signal output ends 222 are located on the same side of the signal detection end 224 along the first direction X, and the signal detection end 224 and the signal compensation end 226 are located on the same side of the two first-common-signal output ends 222. In this way, the orthographic projection of the first-common-signal line 140 on the base substrate 110 can be prevented from intersecting with the orthographic projection of the first conductive part 154 on the base substrate 110, thereby the intersection of the first-common-signal line 140 and the first conductive part 154 along the third direction Z, due to which the parasitic capacitance is caused, can be avoided.

In this embodiment, when the display device 20 is in operation, the voltage variation of the first common electrodes 130 may be detected first, and then the voltage variation of the first common electrodes 130 is compensated. For example, all the second conductive parts 152 shown in FIG. 13 are respectively referred to, by position, as a first one of the second conductive part 152 (located at the top along the second direction Y) in a first column (located on the left-side columns along the first direction X), a second one of the second conductive parts 152 in the first column a third one of the second conductive parts 152 in a second column and a fourth one of the second conductive parts 152 (located at the bottom in the second direction Y) in the second column (located on the right-side columns along the first direction X). When the voltage variation of the first common electrodes 130 needs to be detected, the first one of the second conductive parts 152 in the first column and the first-common-signal line 140 are enabled to be short-circuited, through the laser irritation, at the position where the orthographic projections of the two intersect, and then the voltage variation of the first common electrodes 130 can be detected at the signal detection end 224. After the detection, the voltage variation of the first common electrodes 130 can be compensated when the compensation signal is output from signal compensation end 226.

Figure 14:
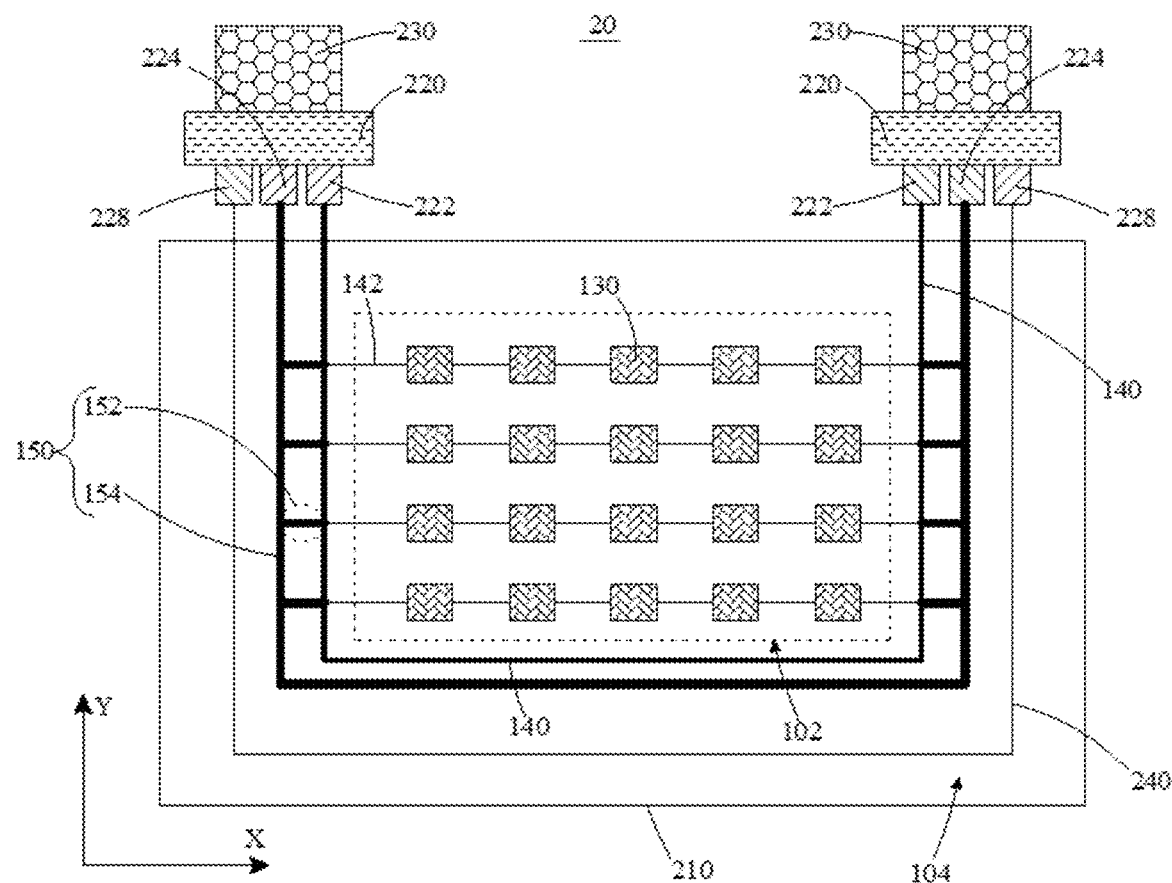
FIG. 14 is a schematic structural diagram of the first type of display device in accordance with a further embodiment of the present application.

FIG. 14 is a schematic structural diagram of a display device 20 according to an embodiment of the present application. As shown in FIG. 14, the chip on film 220 has a second-common-signal output end 228. The second-common-signal output end 228 is connected to the driver 230, thereby enabling the second common signal to be output from the second-common-signal output end 228 when the driver 230 is in operation. Generally, the voltage magnitude of the second common signal is the same as that of the first common signal. The display device 20 also includes a second-common-signal line 240. The second-common-signal line 240 is connected with the second-common-signal output end 228, and the second-common-signal line 240 is connected with the second common electrode 2122. In this way, the second common signal output by the driver 230 when the driver 230 is in operation, can be output to the second common electrode 2122 through the second-common-signal output end 228 and the second-common-signal line 240.

In some embodiments, as shown in FIG. 14, the chip on film 220 may have two second-common-signal output ends 228. The second-common-signal line 240 is connected between the two second-common-signal output ends 228. In this case, the first-common-signal output end 222, the signal detection end 224, the signal compensation end 226 and the like may be located between the two second-common-signal output ends 228. In this way, the orthographic projection of the second-common-signal line 240 on the base substrate 110 is enabled to have no intersection with the orthographic projections of both the first-common-signal lines 140 and the detection lines 150 on the base substrate 110, thereby intersections of the second-common-signal line 240 and the first-common-signal line 140 or the detection line 150 along the third direction Z, due to which the parasitic capacitance is caused, can be avoided.

Figure 15:
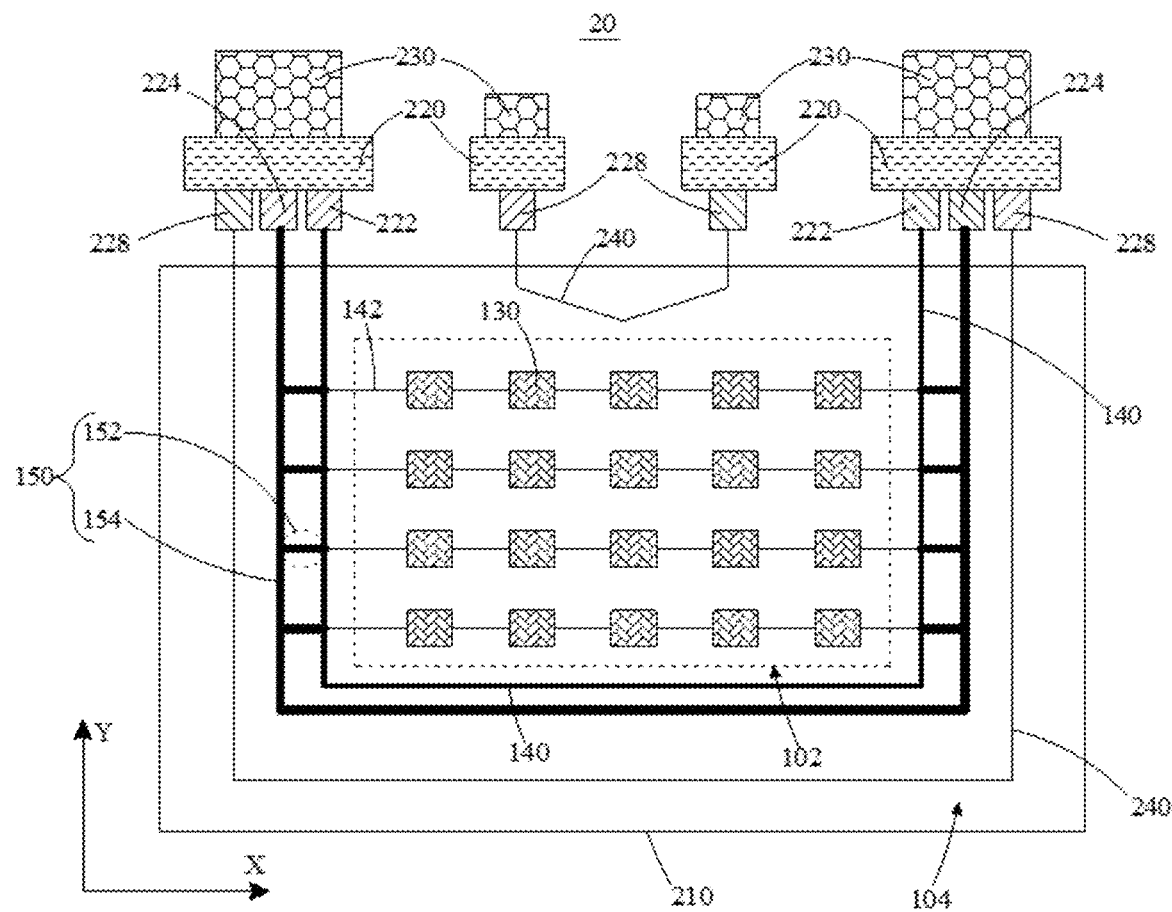
FIG. 15 is a schematic structural diagram of the second type of display device in accordance with a further embodiment of the present application.

In other embodiments, as shown in FIG. 15, the chip on film 220 may have a plurality of second-common-signal output ends 228. The plurality of second-common-signal output ends 228 are all connected to the second common electrode 2122 at different positions through the second-common-signal line 240. In this case, the orthographic projection of the second-common-signal line 240 on the base substrate 110 does not intersect with the orthographic projection of the first-common-signal line 140 and the detection line 150 on the base substrate 110, thereby the intersections of the second-common-signal line 240 and the first-common-signal line 140 or the detection line 150 along the third direction Z, due to which the parasitic capacitance is caused, can be avoided.

The above-mentioned embodiments are only used to illustrate the schemes of the present application, and are not intended to limit the present application. Although the present application has been described in detail with reference to the above-mentioned embodiments, those of ordinary skill in the art should understand that the schemes in the above-mentioned embodiments may be modified, or some features of those embodiments may be equivalently replaced. These modifications or replacements do not make the essence of the corresponding schemes deviate from the fundamental and principles of the schemes in the embodiments of the present application, and should all be included within the protection scope of the present application.

What is claimed is:

1. An array substrate, comprising:
   a base substrate; and
   a plurality of pixel electrodes, a plurality of first common electrodes, a first-common-signal line and a connection line, disposed on the base substrate;
   wherein the array substrate comprises a first region and a second region surrounding the first region along an extending direction of the base substrate, the plurality of pixel electrodes and the plurality of first common electrodes are located in the first region, and one of the plurality of first common electrodes is configured to be coupled with one of the plurality of pixel electrodes to form a capacitor, the first-common-signal line is located in the second region, a first end of the connection line is connected with the first-common-signal line, and a second end of the connection line is connected with the plurality of first common electrodes; and
   wherein the array substrate further comprises a detection line, a portion of the detection line is located in the second region, and the other portion of the detection line is extended outside the base substrate, the detection line and the first-common-signal line are insulated from each other, and an orthographic projection of the detection line on the base substrate and an orthographic projection of the first-common-signal line on the base substrate have at least one intersection point.

2. The array substrate according to claim 1, wherein the orthographic projection of the detection line on the base substrate is not completely overlapped with the orthographic projection of the first-common-signal line on the base substrate.

3. The array substrate according to claim 1, wherein the array substrate comprises a plurality of connection lines, a first end of each connection line in the plurality of connection lines is connected with the first-common-signal line, and a second end of each connection line in the plurality of connection lines is connected with the first common electrodes; and
   the detection line comprises a first conductive part and at least one second conductive part, a portion of the first conductive part is located in the second region, and the other portion of the first conductive part is extended outside the base substrate, a first end of each second conductive part in the at least one second conductive part is connected with the first conductive part, and an orthographic projection of a second end of each second conductive part in the at least one second conductive part on the base substrate is coincided with an orthographic projection of a first end of one of the plurality of connection lines on the base substrate.

4. The array substrate according to claim 3, wherein the detection line comprises a plurality of second conductive parts, and distances between any two adjacent second conductive parts along an arrangement direction of the plurality of second conductive parts are all equal.

5. The array substrate according to claim 3, wherein an extending direction of the first conductive part is the same as an extending direction of the first-common-signal line.

6. The array substrate according to claim 3, wherein the orthographic projection of the first-common-signal line on the base substrate is located between the orthographic projection of the first conductive part on the base substrate and the first region.

7. The array substrate according to claim 1, wherein the array substrate further comprises an insulator, and the insulator is located between the detection line and the first-common-signal line to enable the detection line and the first-common-signal line to be insulated from each other.

8. A display device, comprising:
   a display panel, comprising:
      an array substrate, comprising:
         a base substrate; and
         a plurality of pixel electrodes, a plurality of first common electrodes, a first-common-signal line and a connection line, disposed on the base substrate;
      wherein the array substrate comprises a first region and a second region surrounding the first region along an extending direction of the base substrate, the plurality of pixel electrodes and the plurality of first common electrodes are located in the first region, and one of the plurality of first common electrodes is configured to be coupled with one of the plurality of pixel electrodes to form a capacitor, the first-common-signal line is located in the second region, a first end of the connection line is connected with the first-common-signal line, and a second end of the connection line is connected with the plurality of first common electrodes; and
      wherein the array substrate further comprises a detection line, a portion of the detection line is located in the second region, and the other portion of the detection line is extended outside the base substrate, the detection line and the first-common-signal line are insulated from each other, and an orthographic projection of the detection line on the base substrate and an orthographic projection of the first-common-signal line on the base substrate have at least one intersection point; and
   a chip-on-film having a first-common-signal output end and a signal detection end, wherein the first-common-signal line is connected with the first-common-signal output end, and the other portion of the detection line is connected with the signal detection end.

9. The display device according to claim 8, wherein the chip-on-film has two first-common-signal output ends and two signal detection ends; the first-common-signal line is connected between the two first-common-signal output ends, and the first-common-signal line is arranged surrounding the first region; the detection line is connected between the two signal detection ends, and the detection line is arranged surrounding the first region; and the two first-common-signal output ends are located between the two signal detection ends.

10. The display device according to claim 8, wherein the chip-on-film has two first-common-signal output ends, one signal detection end and one signal compensation end; the first-common-signal line is connected between the two first-common-signal output ends, and the first-common-signal line is arranged surrounding the first region; the detection line is connected between the signal detection end and the signal compensation end, and the detection line is arranged surrounding the first region; and the two first-common-signal output end is located between the signal detection end and the signal compensation end.

11. The display device according to claim 8, wherein the chip on film has two first-common-signal output ends and one signal detection end, and the two first-common-signal output ends are located on a same side of the signal detection end; the first-common-signal line is connected between the two first-common-signal output ends, and the first-common-signal line is arranged surrounding the first region; the detection line is connected between the signal detection end and one of the two first-common-signal end that is far from the signal detection end, and the detection line is arranged surrounding the first region.

12. The display device according to claim 8, wherein the chip-on-film further has a second-common-signal output end;
the display panel further comprises a color filter substrate, the color filter substrate and the array substrate are arranged in a cell-to-cell manner, the color filter substrate comprises a second common electrode, and the second common electrode is configured to be coupled with each pixel electrode in the plurality of pixel electrodes to form a capacitor; and
the display device further comprises a second-common-signal line, the second-common-signal line is connected with both the second-common-signal output end and the second common electrode, an orthographic projection of the second-common-signal line on the base substrate is not intersected with orthographic projections of the first-common-signal line and the detection line on the base substrate.

13. The display device according to claim 8, wherein the orthographic projection of the detection line on the base substrate is not completely overlapped with the orthographic projection of the first-common-signal line on the base substrate.

14. The display device according to claim 8, wherein the array substrate comprises a plurality of connection lines, a first end of each connection line in the plurality of connection lines is connected with the first-common-signal line, and a second end of each connection line in the plurality of connection lines is connected with the first common electrodes; and
the detection line comprises a first conductive part and at least one second conductive part, a portion of the first conductive part is located in the second region, and the other portion of the first conductive part is extended outside the base substrate, a first end of each second conductive part in the at least one second conductive part is connected with the first conductive part, and an orthographic projection of a second end of each second conductive part in the at least one second conductive part on the base substrate is coincided with an orthographic projection of a first end of one of the plurality of connection lines on the base substrate.

15. The display device according to claim 14, wherein the detection line comprises a plurality of second conductive parts, and distances between any two adjacent second conductive parts along an arrangement direction of the plurality of second conductive parts are all equal.

16. The display device according to claim 14, wherein an extending direction of the first conductive part is the same as an extending direction of the first-common-signal line.

17. The display device according to claim 14, wherein the orthographic projection of the first-common-signal line on the base substrate is located between the orthographic projection of the first conductive part on the base substrate and the first region.

18. The display device according to claim 8, wherein the array substrate further comprises an insulator, and the insulator is located between the detection line and the first-common-signal line to enable the detection line and the first-common-signal line to be insulated from each other.

19. The display device according to claim 8, wherein the detection line is configured to be short-circuited with the first-common-signal line at one of the at least one intersection point to detect a voltage variation at the first common electrode.

20. The array substrate according to claim 1, wherein the detection line is configured to be short-circuited with the first-common-signal line at one of the at least one intersection point to detect a voltage variation at the first common electrode.

* * * * *